March 8, 1927.
A. JOHNSON
SAFETY BUMPER
Filed March 27, 1926
1,620,106
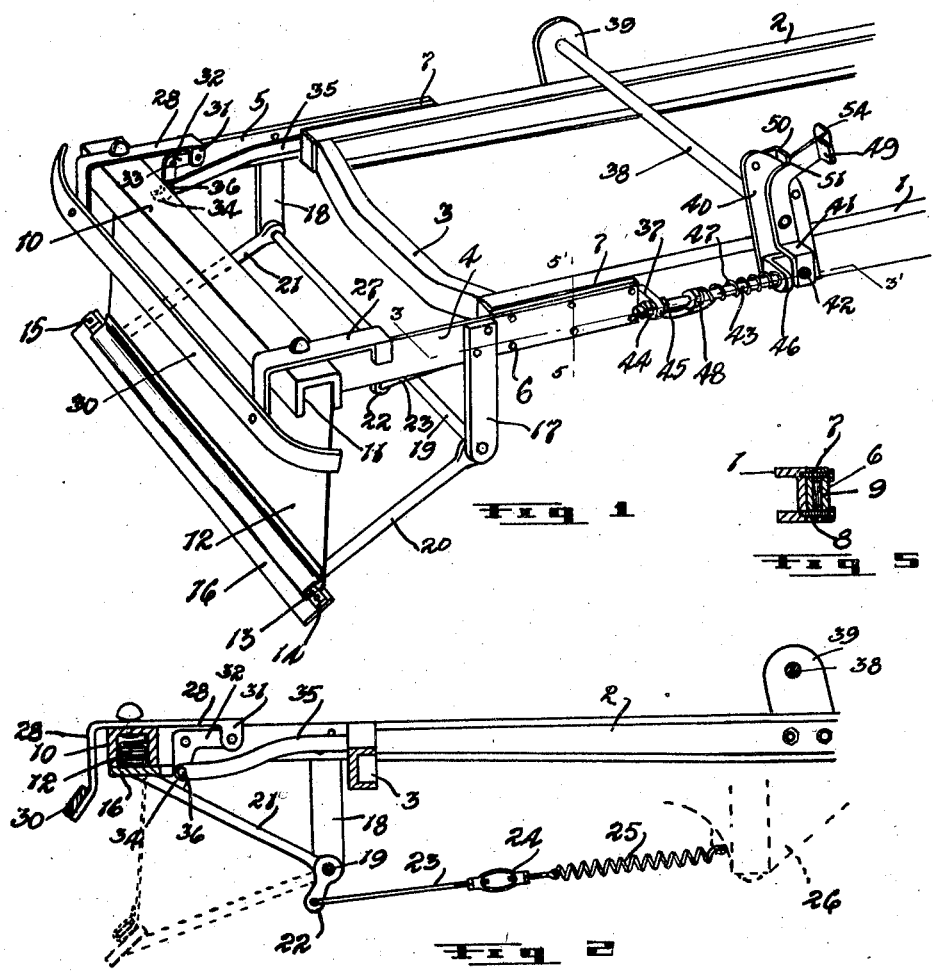
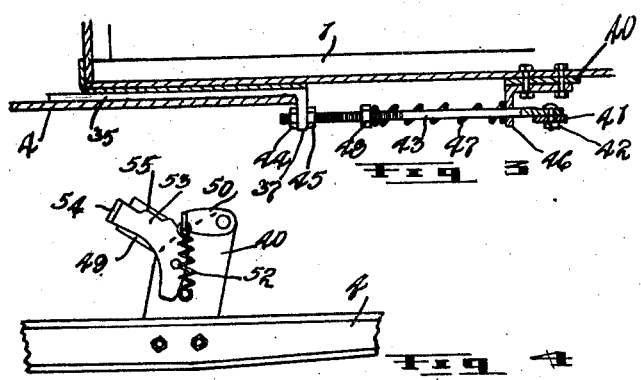
Inventor
A. Johnson

Patented Mar. 8, 1927.

1,620,106

UNITED STATES PATENT OFFICE.

ALRIK JOHNSON, OF KELLIHER, SASKATCHEWAN, CANADA.

SAFETY BUMPER.

Application filed March 27, 1926. Serial No. 97,917.

The invention relates to improvements in safety bumpers and an object of the invention is to provide a normally folded guard curtain associated with a bumper and particularly adapted for automobile use, and wherein the engagement of the bumper with an obstacle on the roadway releases the guard curtain to take an extended position and prevents the obstacle, such as a person, being run over or hurt.

A further object of the invention is to construct the appliance so that the curtain can be actuated as and when desired by the occupant of the automobile.

A further object of the invention is to construct the appliance in a simple, durable and inexpensive manner so that it can be readily attached to the present type of automobile body.

With the above more important and other minor objects in view which will become more apparent as the description proceeds, the invention consists essentially in the arrangement and construction of parts hereinafter more particularly described, reference being had to the accompanying drawing, in which:—

Fig. 1 is a perspective view of the device and showing the curtain in the open position.

Fig. 2 is a vertical sectional view centrally through the device and showing the curtain in the folded position.

Fig. 3 is a horizontal sectional view at 3—3' Figure 1.

Fig. 4 is an enlarged detailed side view of the foot trip and associated parts.

Fig. 5 is a vertical sectional view at 5—5' Figure 1.

In the drawing like characters of reference indicate corresponding parts in the several figures.

The forward portion of the customary automobile is herein shown and embodies side beams 1 and 2 having their forward ends connected by the cross beam 3. My device is attached to the forward end of the automobile frame and comprises the following parts. Similar horizontally disposed side bars 4 and 5 are provided, these being fastened by suitable screws 6 to the beams 1 and 2, it being here observed that the upper and lower spacing plates 7 and 8 are inserted between the bars and the frame to provide an intervening guide slot 9. To the forward ends of the beams I permanently secure a transversely extending beam 10 which has a channel 11 in the under side thereof forming a compartment for housing the guard curtain 12 in the folded position thereof. The channel 11 is herein shown in the form of a channel bar with the flanges down turned and the upper edge of the curtain 12 is suitably permanently fastened to the inner flange of such bar.

The curtain is a flexible one so that it can be readily folded in a stored position as shown in Figure 2 within the channel 11. The lower edge of the curtain is attached to a cross bar 13 and the ends of the cross bar are secured by bolts 14 and 15 to a shoe 16. To the side bars I securely fasten a pair of opposing hangers 17 and 18 which pivotally carry a cross rod 19 and to the cross rod I secure permanently the rear ends of a pair of swinging arms 20 and 21, the forward ends of which are permanently secured to the under side of the shoe. The arrangement of the latter parts is such that when the arms are swung upwardly the shoe closes the channel and the curtain becomes stocked within the channel.

The rod or shaft 19 is provided centrally with a crank 22 and a rod 23 is pivotally attached to the crank at its forward end, and has the rear end fitted with a turn buckle 24. A spring 25 connects the turn buckle with a suitable stationary part of the automobile, such as the fore part of the crank case indicated in dotted outline at 26 Figure 2.

The spring is adapted to pull the shoe downwardly and hold the curtain taut in an extended position, and obviously the turn buckle permits one to readily adjust the position of the spring. Means described is provided for releasably locking the curtain in the folded position against the action of the spring. Similar rocker arms 27 and 28 are attached to the ends of the beam 10, the said bars having their forward ends down turned and supporting a transversely extending fender 30. The rear ends of the rocker bars are forked to span the forward ends of the side arms 4 and 5 and to the inner fork or lug 31 of each rocker arm I pivotally attach the rear end of a bell crank 32 pivotally secured to the adjacent side bars as indicated at 33.

The down turned end of each bell crank terminates in a forwardly extending catch 34 and the catches are adapted to pass underneath the shoe 16 and lock it in an up position. An actuating bar 35 is located on the inner side of each of the bars 4 and 5 and is slidably received within the slot 9 hereinbefore mentioned. The forward end of the actuating bar is pivotally attached at 36 to the downwardly extending arm of the adjacent bell crank and the rear end of each bar terminates in an outwardly extending lug 37. A cross shaft 38 is rotatably carried in upstanding standards 39 and 40 secured to the beams 1 and 2 of the frame, and to each projecting end of the latter shaft I permanently secure a downwardly extending lever 41, the lower end of the lever being L-shaped.

To the lower offset end of each lever I pivotally attach by a bolt 42 the rear end of an adjusting rod 43, the forward end of which is passed through the lug 37 and fastened thereto by adjusting nuts 44 and 45. An angle bracket 46 is secured permanently to the adjacent standard and slidably receives the rod 43. A spiral spring 47 is mounted on the rod, one end engaging the bracket and the other end engaging an adjustable nut 48 mounted on the rod. Obviously the spring 47 in each instance acts to force the rod ahead and in so doing operates through the actuating bar in each instance to hold the catches 34 normally in a locked position underlying the shoe 16.

One of the levers 41 is extended above the shaft 38 to provide a foot pedal 49, and it will be apparent that one pressing forwardly on the foot pedal will cause the catches 34 to be simultaneously withdrawn from the shoe, such permitting the shoe to move down under the action of the spring 25 and spread the curtain.

It will also be observed that should the fender strike an object on the road such as a person, the arms 27 and 28 will rock in such a manner that their rear ends will rise and in so doing will effect the withdrawal of the catches and the consequent release of the shoe and curtain.

I have herein shown means for locking the pedal normally against movement such embodying a latch 50 pivotally attached to the upper end of the standard 40 and normally engaged with a notch 51 formed on the pedal, the latch being held releasably engaged by the action of the coil spring 52 attached to the standard and to the latch and pulling down on the latch. With the latch so locked the curtain will only open when it is released by the obstacle striking the fender. I have provided means, however, for permitting the driver of the car to quickly release the foot pedal if he should desire that the guard curtain open under pedal pressure. Such embodies a lever 53 pivotally attached to the standard 40 and having the uppermost end terminating in a pedal 54, and the top side thereof provided with teeth 55 which upon the pedal end of the lever being pressed forwardly will cause the latch to be raised clear of the notch 51 and free of the pedal 49. Thereafter the forward pressing of the pedal 49 will release the catches 34 and free the guard curtain. I desire that the pedal 49 and associated parts be located within convenient range of the customary clutch and brake pedal of the automobile so that they are close to the foot of the driver.

What I claim as my invention is:—

1. A safety device for automobiles comprising a shield normally retained in an inoperative position above the front wheels of the automobile, means including a bumper for automatically releasing said shield to an operative position in front of said wheels when said bumper is moved by contact with an obstacle, manually controlled means for releasing said shield to operative position independently of the bumper including a control member within convenient reach of the operator of the automobile, and a latch device operable to prevent manual releasment to the shield without interfering with the automatic releasement thereof.

2. A safety device for a motor vehicle, comprising a shield operable to and from an operative position directly in advance of the front wheels of the vehicle, means normally retaining said shield in an inoperative position, means for automatically releasing said shield for movement to operative position including a bumper connected to and serving to release said retaining means when said bumper is moved by contact with an obstacle, manually operable means for releasing said shield for movement to said operative position comprising a control member located within convenient reach of the operator of the vehicle, a latch device for securing said control member against movement, and a connection between said control member and the aforesaid retaining means adapted to release the shield when the control member is freed from said latch and moved in the proper direction, the said connection being designed to afford sufficient lost motion to permit automatic releasement of the shield by the bumper with the manually controlled member latched against movement.

3. In a safety bumper for automobiles, a transversely extending, elevated, normally folded curtain supported from the automobile frame and in advance thereof, an elevated transversely extending fender located in advance of the curtain, pivoted catches normally locking the curtain in its folded position, spring means operating to open the surtain groundward upon the releasing of the catches and movable arms supporting the fender and attached to the catches and adapted upon the fender striking an obstruction to release the catch and free the curtain.

4. In a safety bumper for automobiles, a cross beam supported from the automobile frame and positioned in advance thereof, a normally folded guard curtain having the upper edge thereof secured to the beam, a transversely extending shoe secured to the lower edge of the curtain, rearwardly pivoted side arms having their forward ends secured to the shoe, pivoted catches normally locking the shoe to the beam and retaining the curtain in folded position, spring means associated with the arms and adapted to force the arms downwardly and extending the curtain upon the catches being released and an elevated transversely extending fender in advance of the beam and connected to the catches and movably mounted, whereby in the shifting of the fender by contacting with an obstacle the catches will be released.

5. In a safety bumper for automobiles, a pair of forwardly extending side bars secured to the forward end of the automobile frame, a cross beam secured to the side bars, a normally folded guard curtain having the upper edge thereof secured to the beam, a transversely extending shoe secured to the lower edge of the curtain, catches carried by the side arms and normally locking the shoe to the beam, rearwardly pivoted swinging arms having their forward ends fastened to the shoe, spring means associated with the arms and adapted to forcibly swing the shoe downwardly upon the catches being released, rocker arms carried by the beam, a transversely extending fender secured to the forward down turned ends of the rocker arms, said rocker arms having their rear ends connected to the catches and arranged so that upon the fender engaging an obstacle the catches are released.

6. In a safety bumper for automobiles, a pair of forwardly extending side bars secured to the forward end of the automobile frame, a cross beam secured to the side bars, a normally folded guard curtain having the upper edge thereof secured to the beam, a transversely extending shoe secured to the lower edge of the curtain, catches carried by the side arms and normally locking the shoe to the beam, rearwardly pivoted swinging arms having their forward ends fastened to the shoe, spring means associated with the arms and adapted to forcibly swing the shoe downwardly upon the catches being released, rocker arms carried by the beam, a transversely extending fender secured to the forward down turned ends of the rocker arms, said rocker arms having their rear ends connected to the catches and arranged so that upon the fender engaging an obstacle the catches are released, a foot pedal and a connection between the foot pedal and the catches whereby the catches can be released by the shifting of the foot pedal.

7. In a safety bumper for automobiles, a pair of forwardly extending side bars secured to the forward end of the automobile frame, a cross beam secured to the side bars, a normally folded guard curtain having the upper edge thereof secured to the beam, a transversely extending shoe secured to the lower edge of the curtain, catches carried by the side arms and normally locking the shoe to the beam, rearwardly pivoted swinging arms having their forward ends fastened to the shoe, spring means associated with the arms and adapted to forcibly swing the shoe downwardly upon the catches being released, rocker arms carried by the beam, a transversely extending fender secured to the forward down turned ends of the rocker arms, said rocker arms having their rear ends connected to the catches and arranged so that upon the fender engaging an obstacle the catches are released, a foot pedal and a connection between the foot pedal and the catches whereby the catches can be released by the shifting of the foot pedal, and means for releasably locking the foot pedal against movement.

Signed at Kelliher, this 19th day of February, 1926.

ALRIK JOHNSON.